Patented Sept. 27, 1932

1,879,240

UNITED STATES PATENT OFFICE

JOSEF HILGER AND KARL WIEDEMANN, OF COLOGNE-MULHEIM-ON-THE-RHINE, GERMANY, ASSIGNORS TO GENERAL ANILINE WORKS, INC., OF NEW YORK, N. Y., A CORPORATION OF DELAWARE

AZO DYESTUFFS

No Drawing. Application filed March 20, 1930, Serial No. 437,595, and in Germany March 30, 1929.

The present invention relates to new azo dyestuffs containing copper, more particularly it relates to dyestuffs which may be represented by the probable general formula

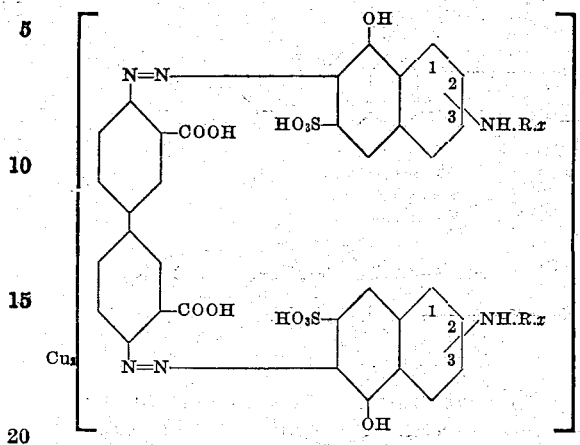

wherein R stands for an aromatic nucleus, for instance, of the benzene series or for a benzoyl group and $x$ stands for a group inducing solubility in water such as —COOH, —SO$_3$H, —OCH$_2$.COOH, the group —NH.R.$x$ standing in 2 or 3 position of the naphthalene nucleus and wherein all nuclei may be further substituted, for instance, by —COOH, —SO$_3$H, —OH, halogen, alkyl and alkoxy.

Our new dyestuffs are obtainable by coupling in alkaline solution a tetrazotized benzidine - ortho - ortho' - dicarboxylic acid compound with two molecules of the same or different 2 or 3-phenol or benzoylamino-5-naphthol-7-sulfonic acid compounds in which the phenyl or benzoyl residue is at least once substituted by a group inducing solubility in water, in the presence of an agent yielding copper such as copper sulfate, copper hydroxide, tetrammine cupric sulfate or finely divided metallic copper. Our new copper compounds are also obtainable by treating the dyestuffs in substance with an agent yielding copper. The new dyestuffs are furthermore obtainable during the dyeing process by adding a suitable copper compound or finely divided copper to an ordinary Glauber's salt-soda dyeing bath containing the organic component of the new dyestuffs.

Our new azo dyestuffs generally are dark metallic lustrous powders soluble in water, dyeing vegetable fibers violet to blue shades of excellent fastness to light and ironing.

The following examples serve to illustrate our invention, without limiting it thereto:—

*Example 1.*—1072 parts by weight of the azo dyestuff obtainable from 1 molecular proportion of tetrazotized 4.4'-diamino-diphenyl-3.3'-dicarboxylic acid and two molecular proportions of 7'-sulfo-5'-hydroxy-2'- naphthyl - 4 - aminophenoxy - acetic acid (prepared by the interaction of 2.5-dihydroxynaphthalene-7-sulfonic acid with 4-amino-phenoxy acetic acid in the presence of sodium bisulfite) are dissolved in 20,000 parts of water. The solution is rendered weakly acid with acetic acid, while stirring, and a solution of 280 parts by weight of crystallized copper sulfate in 10 times the quantity of water is then added at 80° C. After further heating for 2 hours to 70–80° C. the completely precipitated dyestuff is filtered and converted by means of sodium carbonate into its sodium salt. The latter is salted out from its aqueous solution by means of sodium chloride, pressed and dried. The dyestuff contining copper is a dark powder with a metallic luster, readily soluble in water and dyes vegetable fibers violet to blue shades from a sodium sulfate-sodium carbonate bath. In its free state it has probably the following formula

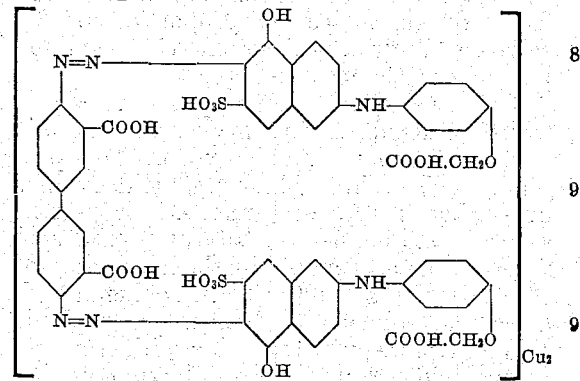

Besides its clearness of shade the dyestuff is distinguished by excellent fastness to ironing, to alkali and to light.

The copper compound of the dyestuff obtainable from one molecular proportion of 4.4'-diaminodiphenyl-3.3'-dicarboxylic acid and two molecular proportions of 7'-sulfo-5'-hydroxy-2'-naphthyl-4-aminophenylthioglycolic acid (prepared by the interaction of 2.5-dihydroxynaphthalene-7-sulfonic acid with 4-aminophenylthioglycolic acid (prepared according to the instructions given in Monatshefte für Chemie, vol. 28, page 278) in the presence of bisulfite) yields somewhat more bluish shades of similar fastness properties.

By means of copper compounds produced in an analogous manner from dyestuffs obtainable from one molecular proportion of tetrazotized 4.4'-diaminodiphenyl-3.3'-dicarboxylic acid and 2 molecular proportions of different 7'-sulfo-5'-hydroxy-2'-naphthyl-amino-aryl-hydroxy acetic acids or arylthioglycolic acids there are obtained similar shades of similar fastness properties. Thus, for example, reddish-blue shades are obtained on vegetable fibers with a copper compound of the azo dyestuff produced in any desired manner from one molecular proportion of tetrazotized 4.4'-diaminodiphenyl-3.3'-dicarboxylic acid, one molecular proportion of 7'-sulfo-5'-hydroxy-2'-naphthyl-4-amino-2-methyl (or 2-chloro)-phenoxy acetic acid, prepared by the interaction of 2.5-dihydroxynaphthalene-7-sulfonic acid with 4-amino-2-methyl-(or 2-chloro)-phenoxy acetic acid in the presence of sodium bisulfite and one molecular proportion of 7'-sulfo-5'-hydroxy-2'-naphthyl-4-aminophenoxy acetic acid.

The analogous dyestuffs containing copper which, instead of the arylhydroxy acetic acid residues contain aryl hydroxy beta-propionic acid residues, likewise yield dyeings of similar shades and fastness properties. 4-(or 3)-aminophenoxy-beta-propionic acid for example is prepared by the interaction of the sodium salt of 4-(or 3-) nitrophenol with a neutral solution of beta-chloropropionic acid and subsequent reduction with iron and acetic acid. For the introduction of the copper other agents yielding copper, such as, for example, finely divided copper and the like, can be used.

*Example 2.*—A solution of 400 parts by weight of copper sulfate in 5 times the quantity of water is added, while stirring, to a solution of 395 parts by weight of 2.[4'-sulfophenyl]amino-5-hydroxynaphthalene-7-sulfonic acid in 10,000 parts by weight of water containing 400 parts by weight of sodium carbonate. To the resulting suspension a suspension of the tetrazo compound from 272 parts by weight of 4.4'-diaminodiphenyl-3.3'-dicarboxylic acid is run in, while cooling; when the coupling is complete the mixture is diluted with hot water and filtered from unchanged copper hydroxide, which is likewise boiled several times with hot water. The dyestuff containing copper is separated from the solution by the addition of sodium chloride. In its free state it has the probable formula

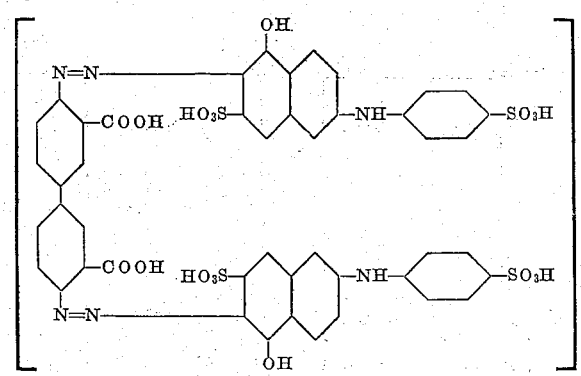

In this combination the 2.[4'-sulfophenyl] amino-5-hydroxy-naphthalene-7-sulfonic acid can be replaced among others by two similar or dissimilar molecules of other 2-aryl-amino-5-hydroxy-naphthalene-7-sulfonic acids containing sulfonic acid groups in the aryl residue; it can be replaced, for example, by the 7'-sulfo-5'-hydroxy-2'-naphthylamino-benzyl-omega-sulfonic acid of the formula

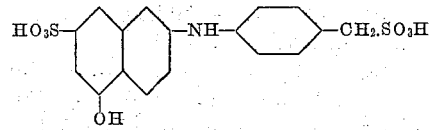

and similar compounds without affecting the satisfactory fastness properties and clear shades of the copper compounds. The coppering can of course also be carried out on the finished dyestuff in accordance with the process described in Example 1 or by other known coppering methods.

*Example 3.*—When coppering according to the method described in Example 1 the azo dyestuff which is obtainable by the combination of one molecular proportion of 4.4'-diaminodiphenyl-3.3'-dicarboxylic acid and two molecular proportions of 2(3'-carboxyphenyl).amino-5-hydroxynaphthalene-7-sulfonic acid, a copper compound is obtained dyeing vegetable fibers powerful clear reddish blue shades of excellent fastness properties. The dyestuff has in its free state probably the following formula

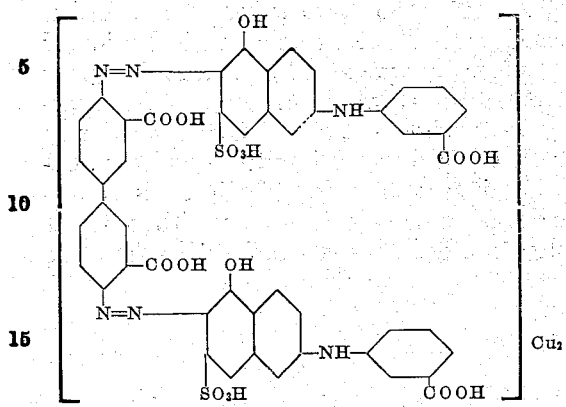

Similar dyestuffs are obtainable by causing agents yielding copper to act on azo dyestuffs obtainable by coupling tetrazotized 4.4'-diaminodiphenyl-3.3'-dicarboxylic acid with the condensation products obtainable in the customary manner by the bisulfite process from 2-amino-5-hydroxy-naphthalene-7-sulfonic acid or 1.6-dihydroxy-naphthalene-3-sulfonic acid and amino-benzonitriles such as for example 3-amino-benzo-nitrile. The compounds thus obtainable are presumably arylated 2-amino-5-hydroxy-naphthalene-7-sulfonic acids containing carbon-amide-residues ($-CONH_2$) in the aryl residue.

*Example 4.*—A dye bath is made up from 2% of the azo dyestuff obtainable from one molecular proportion of tetrazotized 4.4'-diaminodiphenyl-3.3'-dicarboxylic acid and two molecular proportions of 7'-sulfo-5'-hydroxy-2'-naphthyl-3-amino cinnamic acid

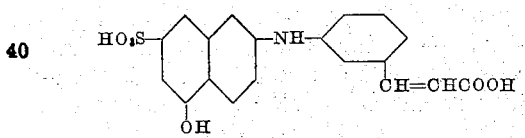

0.2% of copper sulfate, 20% of sodium sulfate and 2% of sodium carbonate. The cotton is entered into this dye bath at 40-50° C., the temperature is slowly raised to boiling and maintained for ½ to 1 hour. After rinsing and drying a clear bluish violet dyeing is obtained of excellent fastness to light, ironing and alkali.

The dyestuff is also very suitable for dyeing half woolen articles.

Analogous copper containing dyestuffs are obtained when coppering according to the directions given in Examples 1 or 2 dyestuffs prepared from one molecular proportion of 4.4'-diamino-diphenyl-3.3'-dicarboxylic acids and two molecular proportions of 7'-sulfo-5'-hydroxy-2'-naphthyl-3-amino cinnamic acid.

*Example 5.*—920 parts by weight of the azo dyestuff from one molecular proportion of tetrazotized 4.4'-diamino-diphenyl-3.3'-dicarboxylic acid and two molecular proportions of 2.[2'-carboxy-benzoyl]amino-5-hydroxynaphthalene-7-sulfonic acid (obtainable by decomposition of 2-amino-5-hydroxynaphthalene-7-sulfonic acid with phthalic acid anhydride in an aqueous solution in the presence of sodium acetate; grey powder easily soluble in water, alkalies and diluted mineral acids) are dissolved in 20,000 parts by weight of water with the addition of some sodium carbonate. The solution is then acidified with acetic acid while stirring and a solution of 300 parts by weight of crystallized copper sulfate in 5 times the quantity of water is then added. After heating for two hours at 70-80° C. the completely precipitated dyestuff is filtered and converted by means of sodium carbonate into its sodium salt. It dyes vegetable fibers from the sodium sulfate-sodium carbonate bath violet shades of excellent fastness properties. In its free state the dyestuff has the following formula

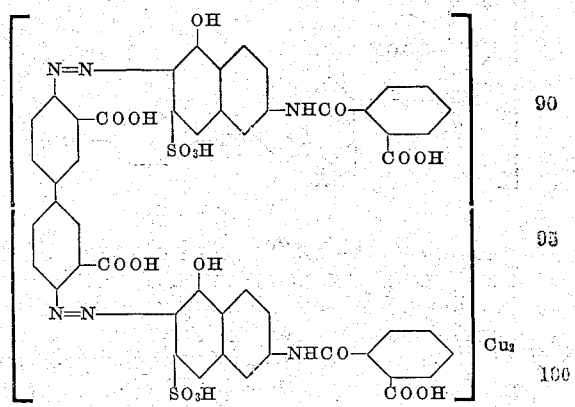

*Example 6.*—When the coppering process of Example 1 is applied to the dyestuff obtainable by coupling one molecular proportion of the tetrazotized 4.4'-diamino-diphenyl-3.3'-dicarboxylic acid with two molecular proportions of 7'-sulfo-5'-hydroxy-2'-naphthyl-4-aminophenyl-acetic acid, a copper compound is obtained which dyes vegetable fibers violet blue shades. The copper compound obtainable in the same manner from the azo dyestuff from one molecular proportion of tetrazotized 4.4'-diamino-diphenyl-3.3'-dicarboxylic acid and two molecular proportions of 7'-sulfo-5'-hydroxy-2'-naphthyl-4-amino-hydro-cinnamic acid (prepared by the interaction of 2.5-dihydroxynaphthalene-7-sulfonic acid with 4-amino-hydro-cinnamic acid in the presence of sodium bisulfite) yields similar, equally fast shades.

Such copper compounds can obviously also be obtained by the processes described in Examples 2 or 3 or by other coppering processes.

*Example 7.*—1072 parts by weight of the azo dyestuff obtainable from one molecular proportion of tetrazotized 4.4'-diaminodiphenyl-3.3'-dicarboxylic acid, one molecular proportion of 7'-sulfo-5'-hydroxy-2'-naphthyl-4-aminophenoxy acetic acid and one molecular proportion of 6'-sulfo-8'-hydroxy-2'-naphthyl-4-aminophenoxy acetic acid are dissolved in 20,000 parts of water. The solution is acidified with acetic acid and a solution of 300 parts by weight of copper sulfate in 5 times the quantity of water is added at 70–80° C. After heating for 2 hours the completely precipitated dyestuff is filtered and converted by means of sodium carbonate into its sodium salt. It dyes vegetable fibers brownish-violet shades. The dyestuff has in its free state the following formula amino-1.1'-diphenylether-4-sulfonic acid in the presence of sodium bisulfite) are dissolved in 20,000 parts of water. The solution is acidified with acetic acid and a solution of 300 parts by weight of crystallized copper sulfate is added, while stirring. After heating for two hours at 70–80° C. the completely precipitated dyestuff is filtered and converted into its sodium salt. The latter is a powder readily soluble in water with a violet coloration and dyes vegetable fibers from the sodium sulfate-sodium carbonate bath bluish-violet shades of excellent fastness to ironing and light.

*Example 8.*—1270 parts by weight of the azo dyestuff obtained from one molecular proportion of 4.4'-diamino-diphenyl-3.3'-dicarboxylic acid and two molecular proportions of 7''-sulfo-5''-hydroxy-2''-naphthyl-2'-amino-1.1'-diphenyl ether-4-sulfonic acid of the formula

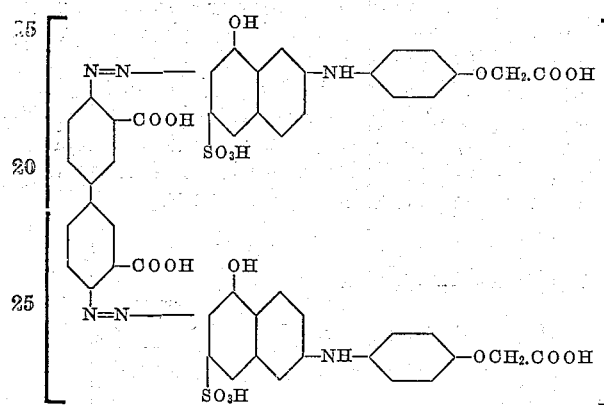

(prepared by the interaction of 2.5-dihydroxynaphthalene-7-sulfonic acid with 2-

*Example 9.*—When the coppering process of Example 1 is applied to an azo dyestuff obtainable by coupling one molecular proportion of tetrazotized 4.4'-diaminodiphenyl-3.3'-dicarboxylic acid with two molecular proportions of 7'-sulfo-5'-hydroxy-2'-naphthyl-4-aminophenol-glycerol ether, there is obtained a dyestuff which dyes vegetable fibers reddish blue shades. The dyestuff has in its free state the following formula Similar dyestuffs are obtained by using instead of the 7'-sulfo-5'-hydroxy-2'-naphthyl-4-aminophenylglycerol ether the 7'-sulfo-5'-hydroxy-2'-naphthyl-4-aminophenol glycolic ether or the 7'-sulfo-5'-hydroxy-2'-naphthyl-4-aminophenol glycolic ether sulfuric acid ester.

We claim:—

1. As new products, copper-containing azo dyestuffs of the probable general formula

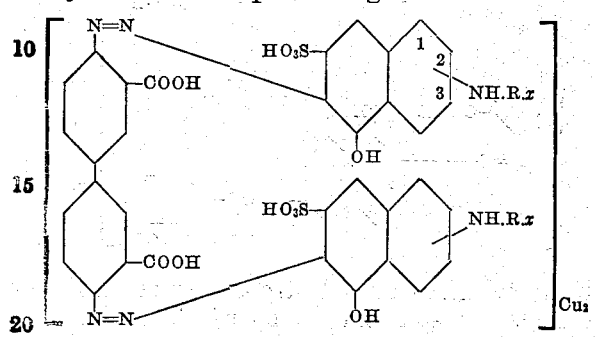

wherein NH.R.$x$ stands in 2 or 3 position of the naphthalene nucleus, R means a radical of the benzene series or a benzoyl radical and $x$ stands for a group inducing solubility in water, being generally dark metallic lustrous substances, easily soluble in water and dyeing vegetable fibers violet to blue shades of excellent fastness to light and ironing.

2. As new products, copper-containing azo dyestuffs of the probable general formula

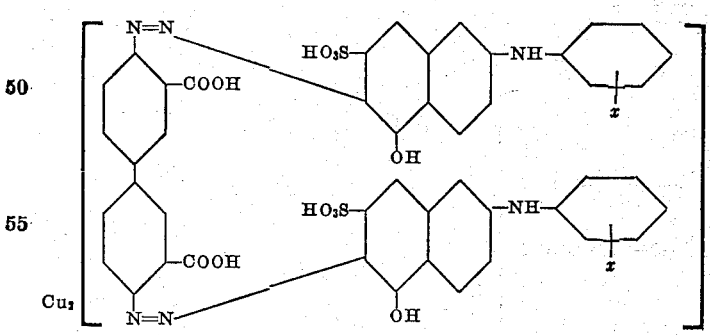

wherein $x$ stands for a group inducing solubility in water and wherein all nuclei may be further substituted by —COOH, —SO$_3$H, —OH, alkyl or alkoxy groups, or halogen atoms, being generally dark metallic lustrous substances, easily soluble in water and dyeing vegetable fibers violet to blue shades of excellent fastness to light and ironing.

3. As new products, copper-containing azo dyestuffs of the probable general formula:

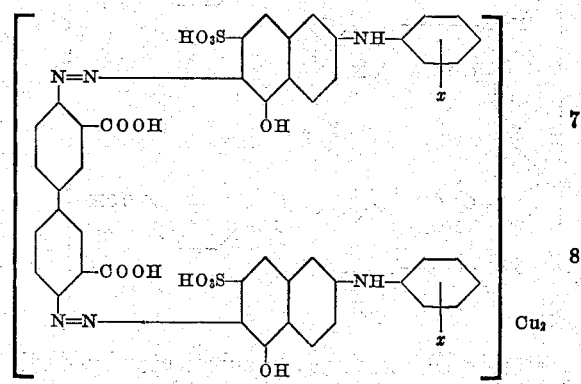

wherein $x$ stands for a group inducing solubility in water and wherein all nuclei may be substituted by alkyl and halogen, being generally dark metallic lustrous substances, easily soluble in water and dyeing vegetable fibres violet to blue shades of excellent fastness to light and ironing.

4. As new products, copper-containing azo dyestuffs of the probable general formula

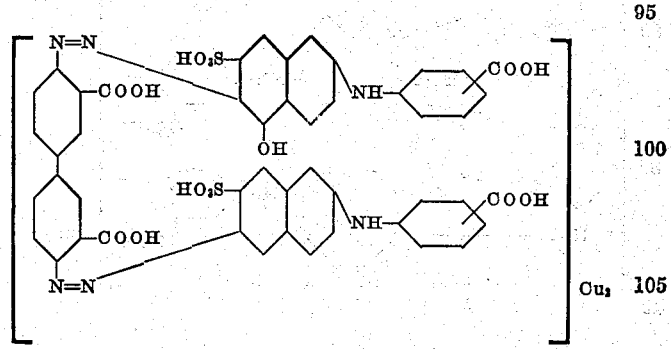

wherein all nuclei may be further substituted by —COOH, —SO$_3$H, —OH, alkyl or alkoxy groups, or halogen atoms, being generally dark metallic lustrous substances, easily soluble in water and dyeing vegetable fibers violet to blue shades of excellent fastness to light and ironing.

5. As new products, copper-containing azo dyestuffs of the probable general formula:

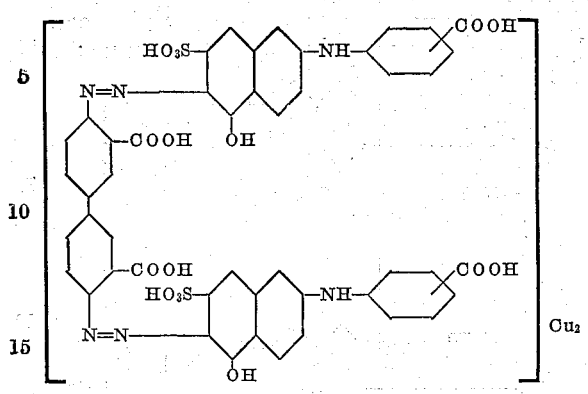

wherein all nuclei may be substituted by alkyl and halogen, being generally dark metallic lustrous substances, easily soluble in water and dyeing vegetable fibers violet to blue shades of excellent fastness to light and ironing.

6. As a new product, the copper-containing azo dyestuff of the probable general formula being a dark metallic lustrous powder, easily soluble in water and dyeing vegetable fibers powerful clear reddish shades of excellent fastness to light and ironing.

7. As a new product the copper-containing azo dyestuff of the following formula:

being a dark metallic lustrous powder, easily soluble in water and dyeing vegetable fibres violet to blue shades of excellent fastness to ironing, alkali and light.

8. As a new product, the copper-containing azo dyestuff of the following formula:

being a dark metallic lustrous powder, easily soluble in water and dyeing vegetable fibres violet shades of excellent fastness to ironing, alkali and light.

In testimony whereof, we affix our signatures.

JOSEF HILGER.
KARL WIEDEMANN.